United States Patent [19]

Weresch

[11] 3,900,053

[45] Aug. 19, 1975

[54] DEVICE FOR CUTTING BENDING AND CORRUGATING THE LEADS OF ELECTRIC COMPONENTS

[76] Inventor: Thomas Weresch, Augartenstrabe 86, D-7500 Karlsruhe, Germany

[22] Filed: Nov. 2, 1973

[21] Appl. No.: 411,929

[30] Foreign Application Priority Data

Nov. 2, 1972 Germany ........................... 2256290

[52] U.S. Cl. ............................ 140/105; 72/DIG. 10

[51] Int. Cl. ............................................ B21f 45/00

[58] Field of Search .......................... 140/1, 71, 105; 72/DIG. 10

[56] References Cited

UNITED STATES PATENTS

| | | | |
|---|---|---|---|
| 2,777,477 | 1/1957 | Zimmerman | 140/71 |
| 2,934,098 | 4/1960 | Strauss | 140/71 |
| 3,403,540 | 10/1968 | Schwartz | 140/71 |
| 3,540,494 | 11/1970 | Susong | 140/1 |

*Primary Examiner*—Lowell A. Larson
*Attorney, Agent, or Firm*—Craig & Antonelli

[57] ABSTRACT

A device for cutting and bending the leads of electrical components, comprising transport sprocket wheels disposed on a shaft, and shearing tools disposed immediately adjacent the same on the device housing, characterized in that two bending sprocket wheels acting as co-acting holders are disposed between the transport sprocket wheels, a bending tool disposed on the housing being associated with each such bending sprocket wheel and laterally thereof, said bending sprocket wheels being slidable in the axial direction together with the bending tools until they abut one another.

51 Claims, 6 Drawing Figures

DEVICE FOR CUTTING BENDING AND CORRUGATING THE LEADS OF ELECTRIC COMPONENTS

This invention relates to a device for cutting and bending the leads of electrical components, comprising transport sprocket wheels disposed on a shaft, and shearing tools disposed immediately adjacent the same on the device housing. The invention also relates to constructing this device so that it also serves for corrugating the leads.

The individual components, such as resistors, diodes, etc. in circuit boards conventional today, for example in printed circuits or the like, are provided with feet to facilitate installation, the said components being inserted into the circuit board by means of said feet, so that direct contact is thus made with the corresponding parts of the circuit, or else the feet are soldered to said parts. The construction of the feet depends on the type of subsequent use and on the space conditions on the circuit board. For example, in the simplest case, the feet can be formed by bending at right angles the leads disposed on each side of the component. In that case, the component is installed horizontally with respect to the circuit board. If there is only a very restricted space available for the component, then it is disposed vertically, so that one lead has to be bent through 180° while the other leads does not have to be bent at all. If the component is to be capable of insertion and be secured in the inserted position, corrugations are provided near the end of the lead and engage in corresponding apertures in the board, the leads yielding resiliently.

When the components, which are usually cylindrical, are manufactured, the leads are initially elongate and straight. They have a considerable allowance so that they can be shortened to the required size at the user's. The components are marketed either individually or in the form of a band in which they are arranged after the style of a ladder. Individually developed devices are known for cutting the leads (U.S. Pat. No. 3,701,298), and separate machines are also used for bending and corrugating respectively. It is also known to perform these operations in one machine, intermittently operating tools being used for the purpose.

The prior-art devices are without exception of complex construction and expensive. In addition, machines having intermittently operating tools have only a relatively low speed of operation, since complicated drives must be provided and these do not allow very high working speeds.

The above-mentioned device constructed solely for cutting or for shortening the leads does allow a relatively high working speed to be used as a result of its construction, since each individual tooth of the transport sprocket wheels can receive the leads of a component. Since the leads are cut by the transport sprocket wheels passing the cutting tools, a continuous operation is obtained, the working speed being dependent practically only on the speed with which, for example, the ladder-type bands can be withdrawn from the supply reel, without there being any obstruction when the component enters the transport sprocket wheel or during the cutting operation.

On this basis, the object of the invention is so to construct this device that the leads can also be bent in the same operation. Another important object of the invention is so to arrange the device that, where required, the leads can also be corrugated.

To achieve the first object of the invention, two bending sprocket wheels acting as co-acting holders are disposed between the transport sprocket wheels a bending tool disposed on the housing being associated with each such bending sprocket wheel and laterally thereof, said bending sprocket wheels being slidable in the axial direction together with the bending tools until they abut one another.

As the components are rotated by the sprocket wheels, the leads pass firstly into the zone of the outwardly disposed shearing tools and secondly into the zone between the bending tools and the co-acting holder sprocket wheels, so that the leads are not only shortened or cut but also bent at the same time. During rotation for transport, the component member passes between the bending sprocket wheels without any tools acting on the member itself, so that damage to it is impossible. As a result of the slidability, the bending sprocket wheels and the bending tools can be adjusted to the appropriate length of the component member so that the leads are bent on either side of the component member. If the bending sprocket wheels and the bending tools are slid until they abut one another and the component member is so introduced as to pass the same on one side, then a component can be made in which only one of the leads is bent through 180°.

According to a preferred embodiment of the invention, adjacent each bending sprocket wheel and opposite the associated bending tool there is disposed a tension relief means which is mounted resiliently on the housing and which cooperates with the bending tool. During the bending of the leads, the latter are subjected to tensile stress. This tensile stress is transmitted to the component member where it generally cannot be taken, so that there is a risk—at least in the case of sensitive components—that the leads will be torn out. The above-described feature of the invention prevents any stress on the component in this respect.

An ejector is disposed in the region of the bottom of the bending sprocket wheels and releases any jammed components and, for example, ejects them to a container. According to another feature of the invention, the bending sprocket wheels have grooves on the facing end faces, said grooves starting from the base of each tooth and extending inwardly. This provides a very considerable advantage. During the bending of the leads, they are clamped in practice between the bending tool and the bending sprocket wheel, and generally the resilience of the leads is such that the components jam between the two bending sprocket wheels. It is even possible, particularly in the case of soft leads, for the latter also to jam between the two bending tools so that they can be removed only with difficulty. The above-mentioned feature has the effect that the leads are pressed into the grooves of the bending sprocket wheels during the bending operation so as to ensure that the component is clamped between the two bending sprocket wheels, i.e., is entrained on rotation of the latter. The component is always ejected by the ejector disposed in the region of the bottom of the bending sprocket wheels.

According to a preferred exemplified embodiment of the invention, an ejector is associated with each bending sprocket wheel and has a guide surface which intersects the path of rotation of the leads in the direction of rotation. The leads situated in the bending sprocket wheel grooves are pressed against the guide surface during rotation. Since the guide surface is inclined in the direction of rotation, the components are accordingly gradually pressed out between the bending sprocket wheels.

According to a very simple exemplified embodiment, the ejector and the tension relief means are disposed on an arm which is mounted resiliently on the housing and which has a contour adapted approximately to the circular shape of the bending sprocket wheel but with a smaller diameter, and with a nose which acts as the tension relief means and which is situated opposite the bending tool, the guide surface beind disposed in the zone of the said arm situated at the bottom of the bending sprocket wheel. The tension relief means and the ejector are thus formed by a single part. As a result of the resilient arrangement, the tension relief means adapts to the varying diameters of the leads.

The other object of the invention, i.e., to construct the device so that it can also be used for corrugating the leads is achieved as follows according to the invention: at least one corrugating sprocket wheel is disposed between each transport and bending sprocket wheel, each of the said corrugating sprocket wheels being associated with a corrugating tool which is disposed on the housing and which forms the corrugation outwardly. In this way it is possible not only to shorten and bend the leads in one operation, but also corrugate them in the region of the ends, so that, for example, they can be inserted and engaged in electrical circuit boards. The corrugating sprocket wheels are of course also mounted slidably on the shaft so that they can be adjusted together with the transport sprocket wheels and the cutting tools. An adjustment may also be provided just between the transport sprocket wheels and the corrugating sprocket wheels if it is necessary to form the corrugations at different distances from the lead ends.

Preferably, the corrugating tool is constructed as a shaped roller with a peripheral groove and is mounted in axis-parallel relationship to the corrugating sprocket wheel, its two edge discs engaging over the teeth of the latter. During corrugation, the lead is bent in by the two edge discs on each side of the corrugating sprocket wheel, so as to form a corrugation. The depth of the corrugation can be chosen by appropriate adjustment of the shaped roller.

According to one advantageous embodiment, the shearing tool is constructed as a disc cutter and is mounted with the shaped roller on a shaft, the shaft being adjustable with respect to the housing. In this way, both the shearing tool and the shaped roller can be adjusted simultaneously to the required dimension.

Advantageously, the transport sprocket wheel has a ground tooth base at its end face facing the corrugating sprocket wheel. Short grooves thus start from the base of the teeth and in conjunction with the shaped roller ensure that the lead is bent out to a shallow depth at its end. In this way the component can be engaged or secured in the conductor panel more satisfactorily.

The invention provides a machine which without the slightest stress on the component member enables the leads to be treated satisfactorily and in diverse ways, it being possible to attain working speeds of up to 70,000 components per hour, as proven in practice. This is more than twice the output with the fastest known machines, while in addition this high working speed is achieved with practically any possible form of construction, without separate tool attachments or the like having to be fitted and removed for the purpose.

These and further objects, features and advantages of the present invention will become more apparent from the following description when taken in connection with the accompanying drawings, which show, for purposes of illustration only, several embodiments in accordance with the present invention.

DETAILED DESCRIPTION OF THE DRAWINGS

Figure 1:
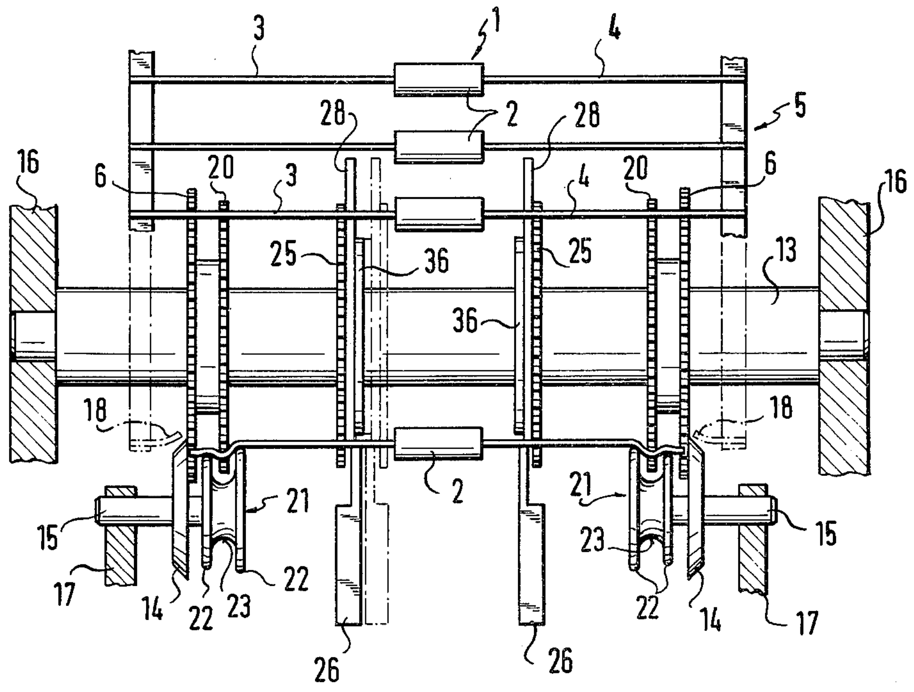
FIG. 1 is a top view of the shaft together with the various sprocket wheels and tools.
Figure 2:
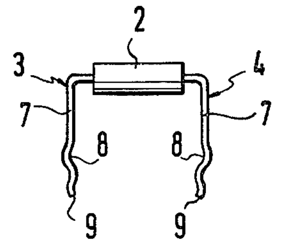
FIG. 2 shows an embodiment of a component for horizontal installation in a circuit panel.
Figure 3:
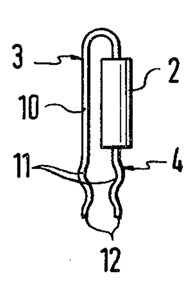
FIG. 3 shows a component for vertical installation in a circuit panel.

Referring to FIG. 1, the electrical components 1, which consist of the component member 2 and the connecting leads 3, 4, are interconnected to form a band in the form of a ladder 5. The said band 5 is wound, for example, on a supply reel (not shown), from which it is unwound by transport sprocket wheels 6. Alternatively, the components 1 may be separate individual items and be fed manually to the transport sprocket wheels 6 via a chute or the like. The components 1 in the rough state have to have their leads treated so that they can be used in an electrical circuit, for example printed circuit. FIGS. 2 and 3 show two relatively complicated embodiments of the final appearance of the components, such as can be made with the device shown in FIGS. 1 and 4–6.

In the case of the component shown in FIG. 2, the two leads 3, 4 are each bent through 90° in relation to the component member 2. Each lead 3, 4 has a rectilinear portion 7 followed in each case by a corrugation 8. The end 9 of each lead is also bent inwardly with a shallow corrugation.

The component shown in FIG. 3 is installed in a vertical position with respect to the circuit board. Accordingly, the lead 3 must be bent through 180° with respect to the component member 2, while the lead 4 is not bent. Also, the lead 3 has to be very long while the lead 4 must be cut off short; the lead 3 accordingly has a long rectilinear portion 10 followed by a corrugation 11 and a corrugated end 12, while the lead 4 consists practically solely of the corrugation 11 and the corrugated end 12.

The transport sprocket wheels 6 are mounted on a shaft 13 (FIGS. 1 and 4) and are secured so as to be axially slidable, for example by means of bushes (not shown) which are also mounted on the shaft 13 via a lockable tongue and groove connection. The shaft 13 is advantageously driven by a steplessly variable motor (not shown). The transport sprocket wheels 6 serve not only for the transport of the components 1 but also as co-acting holders for cutting tools 14 which are disposed opposite the sprocket wheels 6. In the exemplified embodiment illustrated, the cutting tools 14 are constructed in the form of disc cutters and are disposed with a shaft 15 on the housing 16 or a bearing bracket 17 connected thereto. As they pass the disc cutters 14, the leads 3, 4 are trimmed to the required length, the surplus piece of lead 18 travelling on with the band 5.

Another two sprocket wheels 20 which are used to form the corrugations and are disposed adjacent the transport sprocket wheels 6 and are separated by a spacer collar 19 and are situated inwardly of the sprocket wheels 6. The corrugating gear wheels are also mounted slidably on the shaft 13 and serve as co-acting holder for corrugating tools 21 which define the shape of the corrugations 8, 11 (see FIGS. 2 and 3) and which are disposed opposite them, and, in the exemplified embodiment, are constructed as shaped rollers comprising two edge discs 22 and a peripheral groove 23. In the drawing, the shaped roller 21 is integral with the disc cutter 14 and is therefore disposed on the same shaft 15. The roller 21 can engage over the corrugating sprocket wheel 20 by varying amounts, the bearing bracket 17 being adjustable in the direction of the double arrow 24 (see FIG. 4), so that the depth of the corrugation 8, 11 is adjustable.

Figure 4:
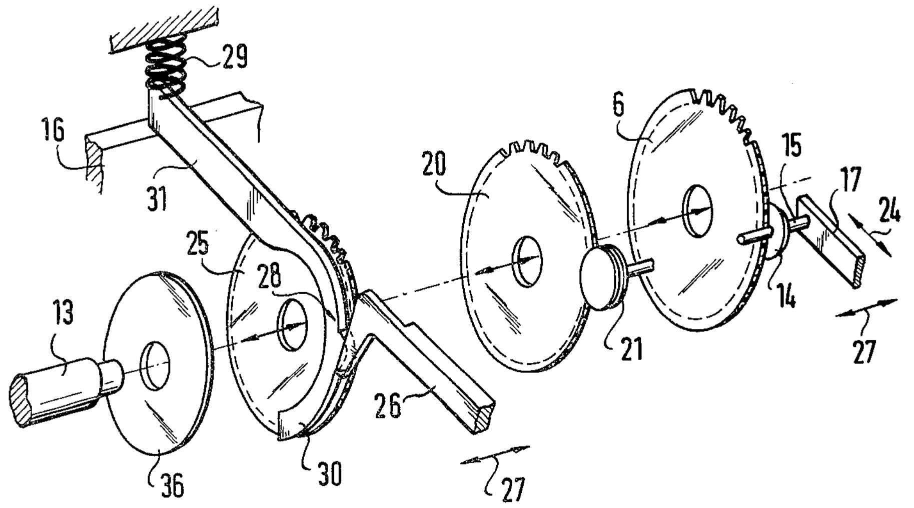
FIG. 4 is an exploded view of the right-hand half of the device referring to FIG. 1.

Two bending sprocket wheels 25 are disposed between the two transport sprocket wheels 6 and the corrugating sprocket wheels 20 and inwardly thereof and also act as co-acting holders for bending tools 26 which are disposed opposite them and which are in turn disposed on the housing 16 so as to be slidable in the direction of the double arrow 27 (see FIG. 4). The bending sprocket wheels 25 are adjustable in the same way so that their spacing can be adjusted, for example, to the length of the component member 2. By appropriate adjustment of the transport and corrugating sprocket wheels it is possible to select the length of the leads 3, 4 and the place where the corrugations 9, 11 are located. Cooperating with the bending tool 26 is a tension relief device 28 which is disposed opposite it and which bears against the housing 16 via a spring 29 (see FIG. 4), so that there is a variable gap between it and the bending tool 26, said gap adapting automatically to the diameter of the leads 3, 4. When the device is in operation, the leads 3, 4 are bent outwardly (downwardly in FIG. 1) in the gap between the bending sprocket wheel 25 and the bending tool 26, the component being clamped between the bending sprocket wheels and being released by means of an ejector.

Figure 5:
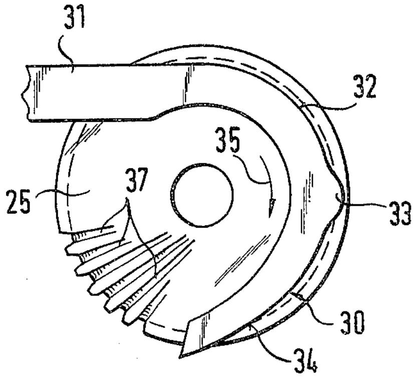
FIG. 5 is an end elevation of the bending sprocket wheel with the tension relief means and ejector.
Figure 6:
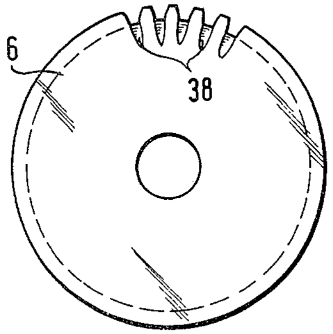
FIG. 6 is an end elevation of a transport sprocket wheel.

FIGS. 4 and 5 show one embodiment of an ejector 30. It is part of an arm 31 which bears against the spring 29 and which approaches the bending sprocket wheel 25 approximately tangentially and then has a contour 32 similar thereto with a somewhat smaller outside diameter. The end edge of the arm 31 is formed into a nose 33 near the bending tool 26, said nose acting as tension relief means. Towards the bottom of the bending sprocket wheel 25, the arm 31 has a guide surface 34 which forms the ejector 30 and which intersects the addendum circle of the sprocket wheel in the direction of rotation 35 thereof. The components run against the guide surface 34 and in so doing are released from the bending sprocket wheels 25. A disc 36 serves to fix the arm 31 axially. In order to prevent the components 1 from jamming between the bending tools 26 (see FIG. 1) during the bending operation, the bending sprocket wheels 25 have grooves 37 at their inner ends, said grooves starting from the base of each tooth and extending inwardly. The leads 3, 4 are pressed into these grooves during the bending operation so that they are in each case driven by the bending sprocket wheels 25 on rotation of the latter.

In order to press out the ends 9, 12 of the components (FIGS. 2 and 3) during the shearing operation by means of the transport sprocket wheels 6 and the cutting tools 14, and thus ensure reliable retention in the circuit board, the transport sprocket wheels 25 are ground on the insides, starting from the base of each tooth, to form a short channel 38 into which the end of the lead is drawn during the cutting operation.

The versatility offered by the device according to the invention in respect of treatment facilities will be apparent from the comparison of the components shown in FIGS. 2 and 3. While the component shown in FIG. 2 can be made with the machine adjustment shown in FIG. 1, the component shown in FIG. 3 is obtained by sliding the right-hand bending sprocket wheel 25 with the tension relief means 28 and the right-hand bending tool 26 until they abut the corresponding tools shown on the left (see chain-dotted line). The right-hand transport sprocket wheel 6 and the corrugating sprocket wheel 20 including the cutting and corrugating tools 14, 21 are moved correspondingly.

While I have shown and described several embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

What I claim is:

1. A device for cutting and bending the leads of electrical components, comprising transport sprocket wheels disposed on a shaft, and shearing tools disposed immediately adjacent the same on the device housing, characterized in that two bending sprocket wheels acting as coacting holders are disposed between the transport sprocket wheels, a bending tool disposed on the housing being associated with each such bending sprocket wheel and laterally thereof, said bending sprocket wheels being slidable in the axial direction together with the bending tools until they abut one another, and characterized in that adjacent each bending sprocket wheel and opposite the associated bending tool there is disposed a tension relief means which is mounted resiliently on the housing and which cooperates with the bending tool.

2. A device according to claim 1, characterized in that an ejector is disposed on the housing in the region of the bottom of the bending sprocket wheels.

3. A device according to claim 2, characterized in that the bending sprocket wheels have grooves on the facing end faces, said grooves starting from the base of each tooth and extending inwardly.

4. A device according to claim 1, characterized in that the bending sprocket wheels have grooves on the facing end faces, said grooves starting from the base of each tooth and extending inwardly.

5. A device according to claim 4, characterized in that an ejector is disposed on the housing in the region of the bottom of the bending sprocket wheels.

6. A device according to claim 5, characterized in that an ejector is associated with each bending sprocket wheel and has a guide surface which intersects the path of rotation of the leads in the direction of rotation.

7. A device according to claim 5, characterized in that the ejector and the tension relief means are disposed on an arm which is mounted resiliently on the housing and which has a contour adapted approximately to the circular shape of the bending sprocket wheel but with a smaller diameter, and with a nose which acts as the tension relief means and which is situated opposite the bending tool, the guide surface being disposed in the zone of the said arm situated at the bottom of the bending sprocket wheel.

8. A device according to claim 7, characterized in that the shearing tools includes a disc cutter mounted with a shaped roller on a shaft.

9. A device according to claim 8, characterized in that the shaft of the shaped roller and the disc cutter are disposed to be adjustable with respect to a housing of said device.

10. A device according to claim 9, characterized in that the transport sprocket wheel has a ground tooth base at its end face facing away from a corrugating sprocket wheel.

11. A device according to claim 5, further comprising means for corrugating the leads of electrical components, characterized in that at least one corrugating sprocket wheel is disposed betweeen each transport and bending sprocket wheel, each of said corrugating sprocket wheels being associated with a corrugating tool which is disposed on the housing and which forms the corrugation outwardly.

12. A device according to claim 5, characterized in that the shearing tools includes a disc cutter mounted with a shaped roller on a shaft.

13. A device according to claim 4, characterized in that an ejector is associated with each bending sprocket wheel and has a guide surface which intersects the path of rotation of the leads in the direction of rotation.

14. A device according to claim 13, characterized in that the ejector and the tension relief means are disposed on an arm which is mounted resiliently on the housing and which has a contour adapted approximately to the circular shape of the bending sprocket wheel but with a smaller diameter, and with a nose which acts as the tension relief means and which is situated opposite the bending tool, the guide surface being disposed in the zone of the said arm situated at the bottom of the bending sprocket wheel.

15. A device according to claim 14, further comprising means for corrugating the leads of electrical components, characterized in that at least one corrugating sprocket wheel is disposed between each transport and bending sprocket wheel, each of the said corrugating sprocket wheels being associated with a corrugating tool which is disposed on the housing and which forms the corrugation outwardly.

16. A device according to claim 15, characterized in that the corrugating tool is constructed as a shaped roller with two edge discs and a peripheral groove, is mounted in axis-parallel relationship to the corrugating sprocket wheel and engages over the teeth of the latter and beyond the base of the teeth by its two edge discs.

17. A device for cutting and bending the leads of electrical components, comprising transport sprocket wheels disposed on a shaft, and shearing tools disposed immediately adjacent the same on the device housing, characterized in that two bending sprocket wheels acting as coacting holders are disposed between the transport sprocket wheels, a bending tool disposed on the housing being associated with each such bending sprocket wheel and laterally thereof, said bending sprocket wheels being slidable in the axial direction together with the bending tools until they abut one another, and further comprising means for corrugating the leads of electrical components, characterized in that at least one corrugating sprocket wheel is disposed between each transport and bending sprocket wheel, each of the said corrugating sprocket wheels being associated with a corrugating tool which is disposed on the housing and which forms the corrugation outwardly.

18. A device according to claim 17, characterized in that the corrugating tool is constructed as a shaped roller with two edged discs and a peripheral groove, is mounted in axis-parallel relationship to the corrugating sprocket wheel and engages over the teeth of the latter and beyond the base of the teeth by its two edge discs.

19. A device according to claim 18, characterized in that the transport sprocket wheel has a ground tooth base at its end face facing away from the corrugating sprocket wheel.

20. A device according to claim 19, characterized in that an ejector is disposed on the housing in the region of the bottom of the bending sprocket wheels.

21. A device according to claim 20, characterized in that the ejector and the tension relief means are disposed on an arm which is mounted resiliently on the housing and which has a contour adapted approximately to the circular shape of the bending sprocket wheel but with a smaller diameter, and with a nose which acts as the tension relief means and which is situated opposite the bending tool, the guide surface being disposed in the zone of the said arm situated at the bottom of the bending sprocket wheel.

22. A device according to claim 21, characterized in that the ejector and the tension relief means are disposed on an arm which is mounted resiliently on the housing and which has a contour adapted approximately to the circular shape of the bending sprocket wheel but with a smaller diameter, and with a nose which acts as the tension relief means and which is situated opposite the bending tool, the guide surface being disposed in the zone of the said arm situated at the bottom of the bending sprocket wheel.

23. A device according to claim 17, characterized in that the transport sprocket wheel has a ground tooth base at its end face facing away from the corrugating sprocket wheel.

24. A device according to claim 17, characterized in that an ejector is disposed on the housing in the region of the bottom of the bending sprocket wheels.

25. A device according to claim 17, characterized in that adjacent each bending sprocket wheel and opposite the associated bending tool there is disposed a tension relief means which is mounted resiliently on the housing and which cooperates with the bending tool.

26. A device according to claim 25, characterized in that an ejector is disposed on the housing in the region of the bottom of the bending sprocket wheels.

27. A device for cutting and bending the leads of electrical components, comprising transport sprocket wheels disposed on a shaft, and shearing tools disposed immediately adjacent the same on the device housing, characterized in that two bending sprocket wheels acting as coacting holders are disposed between the transport sprocket wheels, a bending tool disposed on the housing being associated with each such bending sprocket wheel and laterally thereof, said bending sprocket wheels being slidable in the axial direction together with the bending tools until they abut one another, and characterized in that the shearing tools includes a disc cutter mounted with a shaped roller on a shaft.

28. A device according to claim 27, characterized in that the shaft of the shaped roller and the disc cutter are disposed to be adjustable with respect to a housing of said device.

29. A device according to claim 27, characterized in that the transport sprocket wheel has a ground tooth base at its end face facing away from a corrugating sprocket wheel.

30. A device for forming the leads of electrical components comprising:

at least one bending sprocket wheel having bending sprocket means engageable with a lead of an electrical component for applying bending forces thereto, and at least one corrugating sprocket wheel spaced from said bending sprocket wheel and having corrugating sprocket means engageable with said lead for applying corrugating forces thereto.

31. A device according to claim 30, further comprising shearing means for shearing said lead.

32. A device according to claim 31, wherein said bending and corrugating sprocket wheels are disposed on a common rotatable shaft, and wherein said shearing means includes at least one transport sprocket wheel disposed on said shaft.

33. A device according to claim 30, wherein two of said bending sprocket wheels are provided which are spaced from one another for applying bending forces to respective leads extending from opposite ends of said electrical component.

34. A device according to claim 33, wherein two of said corrugating sprocket wheels are provided which are spaced from one another for applying corrugating forces to respective leads extending from opposite ends of said electrical component.

35. A device according to claim 34, wherein said bending sprocket wheels and corrugating sprocket wheels are disposed on a common rotatable shaft.

36. A device according to claim 35, wherein said bending sprocket wheels are disposed in between said corrugating sprocket wheels.

37. A device according to claim 36, further comprising shearing means for shearing said lead.

38. A device according to claim 37, wherein said shearing means includes transport sprocket wheels on said common shaft and cutter means fixed in position on a device housing.

39. A device according to claim 38, wherein said transport sprocket wheels include grooves extending along the side face thereof a distance greater than in the mid portion thereof for accommodating guiding of said lead during cutting thereof.

40. A device according to claim 30, wherein two of said corrugating sprocket wheels are provided which are spaced from one another for applying corrugating forces to respective leads extending from opposite ends of said electrical component.

41. A device according to claim 30, wherein said bending sprocket wheels and corrugating sprocket wheels are disposed on a common rotatable shaft.

42. A device according to claim 30, further comprising tension relief means including resiliently biased back-up means engageable with one of said lead and said electrical component during bending of said lead by said bending sprocket means.

43. A device according to claim 42, wherein said resiliently biased back-up means is engageable directly with said lead.

44. A device for forming the leads of electrical components comprising:

at least one bending sprocket wheel having bending sprocket means engageable with a lead of an electrical component for applying bending forces thereto, and tension relief means including resiliently biased back-up means engageable with one of said lead and said electrical component during bending of said lead by said bending sprocket means.

45. A device according to claim 44, wherein said resiliently biased back-up means is engageable directly with said lead.

46. A device according to claim 44, wherein two of said bending sprocket wheels are provided which are spaced from one another for applying bending forces to respective leads extending from opposite ends of said electrical component.

47. A device according to claim 46, further comprising shearing means for shearing said lead.

48. A device according to claim 47, wherein said shearing means includes transport sprocket wheel on said common shaft and cutter means fixed in position on a device housing.

49. A device according to claim 47, wherein said transport sprocket wheels include grooves extending along the side face thereof a distance greater than in the mid portion thereof for accommodating guiding of said lead during cutting thereof.

50. A device according to claim 44, wherein a relatively fixed bending tool is provided for engaging a side of said lead opposite said bending sprocket wheel to forcibly bend said lead, and wherein said tension relief means includes an arm resiliently mounted on a housing of said device, said arm having a contour approximately adapted to the circular shape of said bending sprocket wheel but with a smaller diameter, said arm including a nose serving as said back-up means and disposed opposite the bending tool.

51. A device according to claim 50, wherein said arm also serves as a portion of an ejector for removing said lead from said bending sprocket wheel after bending thereof.

* * * * *